United States Patent [19]

Koda et al.

[11] 3,849,795

[45] Nov. 19, 1974

[54] VIDEO TAPE RECORDER IN WHICH THE DRUM IS ROTATED SYNCHRONOUSLY WITH SIGNALS ON TAPE

[75] Inventors: Minoru Koda; Tadao Shioyama; Akio Nishiyama, all of Osaka, Japan

[73] Assignee: Matsushita Electric Industrial Co., Ltd., Kadoma, Osaka, Japan

[22] Filed: May 31, 1973

[21] Appl. No.: 365,722

[30] Foreign Application Priority Data

June 5, 1972 Japan .............................. 47-56357

[52] U.S. Cl. ......................... 360/73, 360/70, 360/84

[51] Int. Cl.... G11b 5/52, G11b 21/02, G11b 15/28

[58] Field of Search ........... 179/100.2 T; 178/6.6 A, 178/6.6 DD; 360/73, 84

[56] References Cited

UNITED STATES PATENTS

| | | | |
|---|---|---|---|
| 3,352,977 | 11/1967 | Shashoua | 179/100.2 T |
| 3,378,646 | 4/1968 | Shashoua et al. | 179/100.2 T |
| 3,389,217 | 6/1968 | Kihara | 179/100.2 T |
| 3,390,231 | 6/1968 | Youngquist | 179/100.2 T |
| 3,588,378 | 6/1971 | Protas | 179/100.2 T |
| 3,651,276 | 3/1972 | Clark | 179/100.2 T |

*Primary Examiner*—Alfred H. Eddleman
*Attorney, Agent, or Firm*—Wenderoth, Lind & Ponack

[57] ABSTRACT

A video tape recorder has a cylindrical drum having at least one video head, a drum motor for rotating the video head, a capstan for moving the tape, a capstan motor for rotating the capstan, a detector for detecting the rotational speed of the video head, and a switch responsive to the detector so as to supply electric power to the capstan motor when the rotational speed of the video head exceeds a predetermined value.

5 Claims, 4 Drawing Figures

VIDEO TAPE RECORDER IN WHICH THE DRUM IS ROTATED SYNCHRONOUSLY WITH SIGNALS ON TAPE

BACKGROUND OF THE INVENTION

This invention relates to a video tape recorder, and more particularly to a video tape recorder in which a rotary video head scans a magnetic tape to record and/or playback video signals.

For the recording and playback of video signals, a conventional video tape recorder is provided with a cylindrical drum having a rotatable video head around which a magnetic tape is wrapped. During movement of the tape in the longitudinal direction thereof, video signals are successively recorded on the tape or reproduced from the tape by the rotating video head. It is a problem in such a video tape recorder that the tape may be damaged by excessive tension when the tape is pulled by a capstan and a pressure roller while the video head stands still. This matter is especially a serious problem in a video tape recorder with a single rotary video head wherein the tape is wrapped around a rotatable cylindrical drum through an angle of 360°, wherein one field of the video signal is successively recorded or reproduced for every one rotation of the head which is mounted on said cylindrical drum. In such a video tape recorder, an air film is produced between the periphery of the rotating cylindrical drum and the tape after the drum has been rotated at a high speed. In such a condition the tape can be moved smoothly in the longitudinal direction by a capstan and a pressure roller.

On the other hand, the tape may be clinched around the drum by virture of greater friction between the periphery of the drum and the tape, when the tape is moved before the rotational speed of the drum exceeds a predetermined value. This imparts excess load not only to the motor for rotating the video head and the drum but also to the motor for rotating the capstan. As the result, the base film of the tape may be given a permanent deformation.

SUMMARY OF THE INVENTION

It is therefore an object of the present invention to provide a novel and improved video tape recorder having at least one rotatable video head.

Another object of the present invention is to provide an improved video tape recorder wherein a capstan motor starts to rotate after the rotational speed of a video head has exceeded a predetermined value.

Still another object of the present invention is to provide an improved video tape recorder having which is inexpensive to manufacture and reliable in operation and which has means for the detection of the rotational speed of a video head.

These objects are achieved by providing a video tape recorder according to the present invention which comprises a cylindrical drum having at least one rotatable video head for scanning a tape wrapped around said drum;

a drum motor for rotating said video head;

a capstan for moving the tape in the longitudinal direction thereof in conjunction with a pressure roller;

a capstan motor for rotating said capstan;

detecting means for detecting the rotational speed of said video head; and switch means responsive to said detecting means so as to supply electric power to said capstan motor when the rotational speed of said video head exceeds a predetermined value.

BRIEF DESCRIPTION OF THE DRAWINGS

Further objects and advantages of the invention will become apparent from the following detailed description considered in connection with the accompanying drawings, in which.

DETAILED DESCRIPTION OF THE PREFERRED EMBODIMENT

Figure 1:
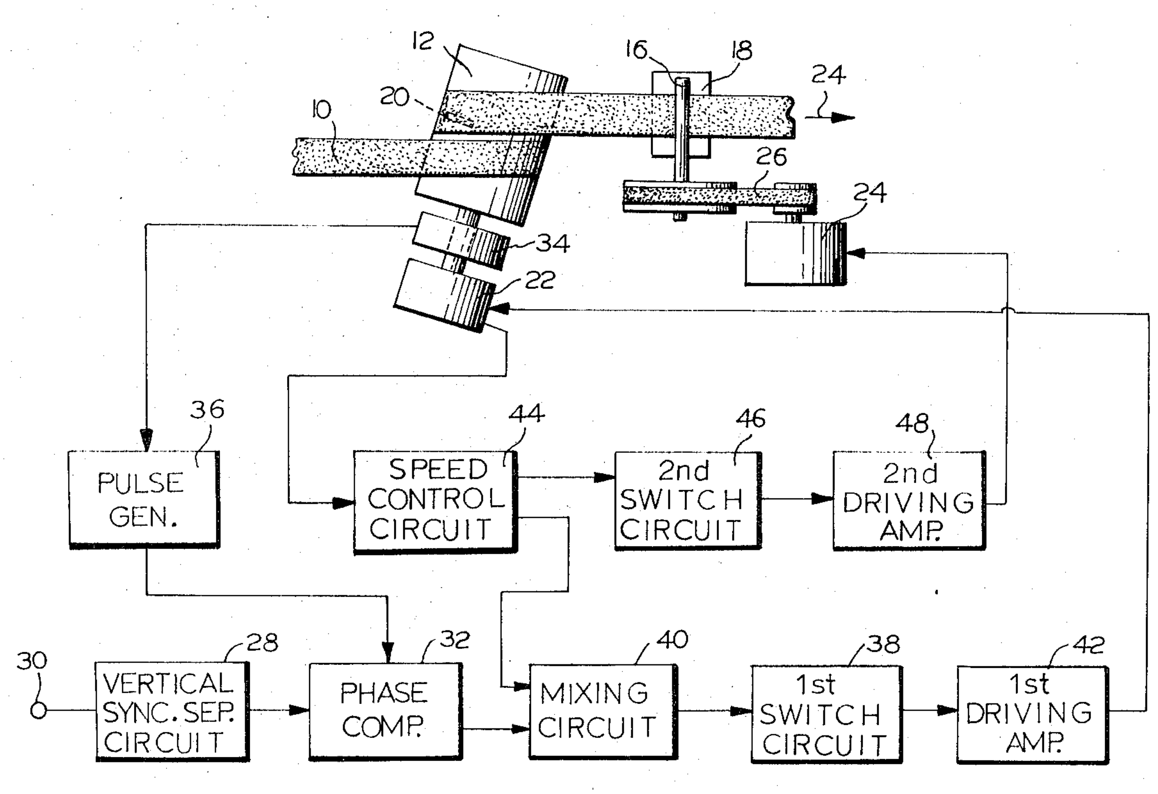
FIG. 1 is a diagramatic view of a video tape recorder according to the present invention.

Referring now to the drawings, there will be explained one embodiment of a video tape recorder according to the present invention.

With reference to FIG. 1, a magnetic tape designated by a reference numeral 10 is wrapped around a cylindrical drum 12through an angle of approximately 360°, and it is moved in the direction of the arrow 14 by a capstan 16 and a pressure roller 18. The cylindrical drum 12 is made of a non-magnetic material and it is provided with a video head 20. The drum 12 is directly coupled to a drum motor 22 so as to be rotated with the video head 20 at a speed of 3,600 r.p.m.

The capstan 16 is driven by a capstan motor 24 through an endless belt 26.

Video signals are supplied to a vertical synchronizing signal separating circuit 28 through an input terminal 30. Vertical synchronizing signals are separated from said video signals by said circuit 28 and added to a phase comparator 32. On the other hand, signals representing the rotational phase of the cylindrical drum 12, which are detected by a detecting circuit 34, are reformed into a pulse wave by a pulse generator 36, and then added to said phase comparator 32. The phase comparator 32 compares the phase of said pulse wave and that of the vertical synchronizing signals. The output of the phase comparator 32 is added to a first switch circuit 38 through a mixing circuit 40. The first switch circuit 38 is arranged to be placed in a closed state when the pressure roller 18 and the capstan 16 are in pressing engagement.

The output of the first switch circuit 38 is added to a first driving amplifier 42, and then to the drum motor 22 so as to energize said drum motor 22. A speed control circuit 44, which will be described hereinafter in detail, is provided for the purpose of controlling the rotational speed of the drum motor 22. The output of the speed control circuit 44 is added to the mixing circuit 40 so as to control rotational speed of the drum motor 22, and is added to a second switch circuit 46 which controls a second driving amplifier 48 in such a manner that the capstan motor 24 starts to rotate when the rotational speed of the drum motor 22 exceeds a predetermined value. This control operation will be described hereinafter in detail.

Figure 2:
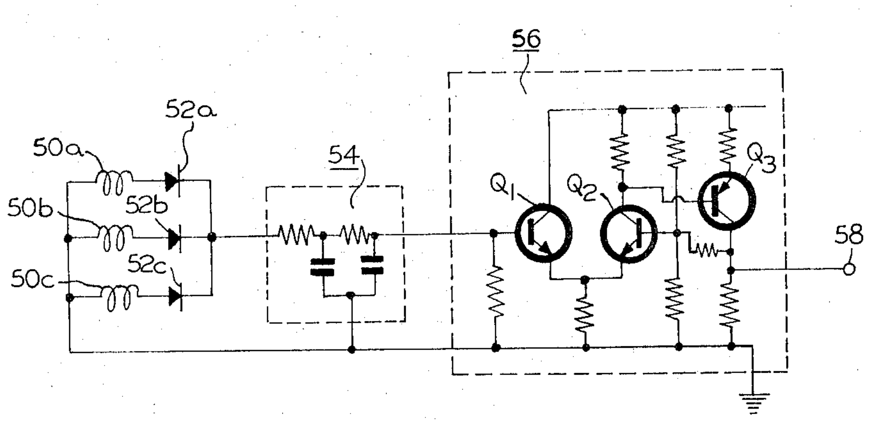
FIG. 2 is a diagramatic illustration of an electrical circuit embodying detecting means for detecting the rotational speed of a drum motor according to the present invention.

With reference to FIG. 2, one embodiment of the speed control circuit 44 is shown herein. As the drum motor 22 in this embodiment, a brushless DC motor is employed in which a rotor is a permanent magnet is rotated under the control of an electronic switch for controlling the current in the main windings. Generating windings 50*a*, 50*b* and 50*c* are provided in the same slots as the main windings.

Voltage is generated in the generating windings 50*a*, 50*b*, 50*c* according to the speed of rotation of the drum motor 22 respectively, and it is sent to rectifiers 52*a*, 52*b* and 52*c* to be rectified. The rectified output from said rectifiers is added to a smoothing circuit 54, which comprises resistors and capacitors, so as to remove ripples therein, and then it is appropriately amplified by a differential amplifier 56 which comprises transistors $Q_1$, $Q_2$ and $Q_3$. The output of said amplifier 56 is taken from an output terminal 58.

Figure 3:
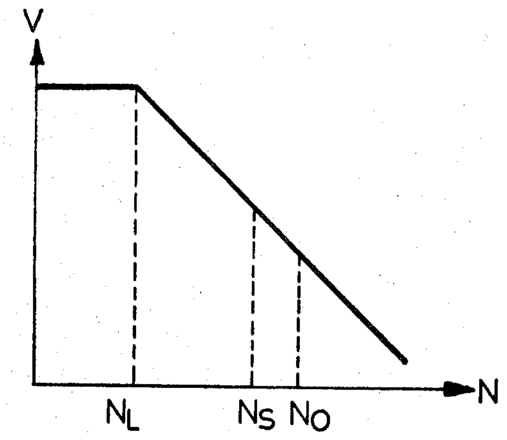
FIG. 3 is a graph showing a characteristic of said electrical circuit of FIG. 2.

FIG. 3 shows the characteristic of the above speed control circuit 44. The horizontal axis represents the rotational speed N of the drum motor 22, and the vertical axis represents the output voltage V of the DC amplifier 56. The output voltage V is reduced as the rotational speed rises, after the rotational speed exceeds a certain value $N_L$ which can be set freely by selecting an appropriate base-bias voltage of the transistor $Q_2$.

In FIG. 3, $N_O$ represents the normal rotational speed of the drum motor 22.

There will next be explained how the output voltage V of the output terminal 58 actuates the second switch circuit 46 and controls the starting or the stoping of the capstan motor 24 through the second driving amplifier 48.

Figure 4:
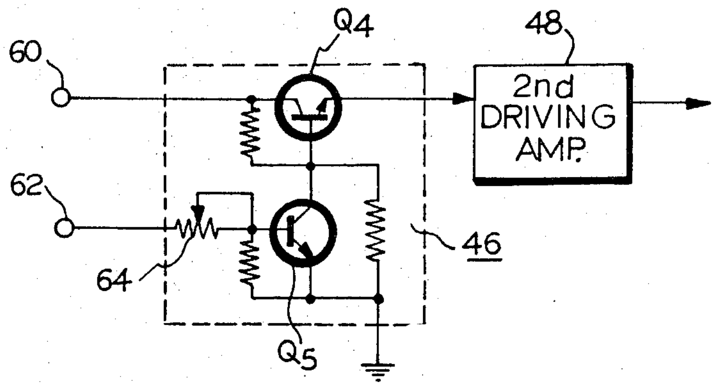
FIG. 4 is a diagramatic illustration of an electrical switch circuit for a capstan motor according to the present invention.

FIG. 4 shows an embodiment of the second switch circuit 46 within the dash line. A terminal 60 is connected to a power supply, and terminal 62 is connected to the output terminal 58 of the speed control circuit 46. The power supply for the second driving amplifier 48 is controlled by on-off operation of transistors $Q_4$ and $Q_5$. A variable resistor 64 is so regulated that the transistor $Q_5$ is brought to a cut off condition when the rotational speed of the drum 22 exceeds a value $N_S$ which is smaller than the value $N_O$, the normal rotational speed of the motor 22. While the drum motor 22 is rotating at the lower speed than the value $N_S$, the transistor $Q_5$ remains in saturated condition, and the transistor $Q_4$ is in the cut-off condition, so that electric power is not supplied to the second driving amplifier 48. Therefore, the capstan motor 24 does not rotate.

When the rotational speed of the drum motor 22 exceeds a value $N_S$, the transistor $Q_5$ is changed to the cut-off condition and then the transistor $Q_4$ is changed to the conductive condition, so that electric power is supplied to the second driving amplifier 48. Therefore, the capstan motor 24 starts to rotate to move the tape 10. With the movement of the tape 10 in the direction of the arrow 14, the video head 20 scans the tape 10 helically to record the video signals on it.

In above description, the drum motor 22 is rotated synchronously with the vertical synchronizing signals of the video signals which are added to the input terminal 30, for recording. In case of the playback of the recorded signals from the tape 10, the drum motor 22 can be rotated synchronously with control signals recorded on the tape 10. In the present invention, the drum motor 22 is supplied with electric power through the first driving amplifier 42 when the first switch circuit 38 is actuated upon operation of the mechanical driving element such as the pressure roller 18. After the rotational speed of drum motor 22, i.e. that of the video head 20, has exceeded a predetermined value, the capstan motor 17 starts to rotate and the capstan 16 and the pressure roller 18 start to move the tape 10. After the rotation of the drum 12, an air film is produced between the periphery of the drum 12 and the tape 10 so that the tape 10 can be driven smoothly. If the drum motor 22 does not rotate for any reason, the capstan motor 24 also does not rotate, so that electric power will not be consumed unnecessarily.

Detecting means for detecting the rotational speed of the drum motor described in the above embodiment as generating windings 50*a*, 50*b* and 50*c* can be easily replaced by other means such as a device for detecting an interval between pulses which are produced in accordance with the rotation of the cylindrical drum having the video head.

The present invention is not limited only to a video tape recorder employing a single video head, but can be applied also to a video tape recorder with a plurality of video heads.

It is apparent that various modification may be made without departing from the substantial properties in the invention. The above described specific example is intended merely to illustrate the various facets in one embodiment of the invention, the scope of which it is intended shall be limited only by the following claims.

What is claimed is:

1. A video tape recorder comprising:

a cylindrical drum having at least one rotatable video head for scanning a tape wrapped around said drum;

a drum motor coupled to said drum for rotating said drum and video head;

a capstan and a pressure roller for moving the tape in the longitudinal direction thereof in conjuction with each other;

a capstan motor coupled to said capstan for rotating said capstan;

detecting means coupled to said drum for detecting the rotational speed of said video head; and switch means coupled to said detecting means and said capstan motor and adapted to be coupled to a source of electric power for supplying power to said capstan motor, the detecting means controlling said switch means to the off condition during the time when said rotational speed of said video head is no higher than a predetermined speed, whereby no electric power for rotating said capstan motor is supplied through said switch means to said capstan motor, and the detecting means controlling the switch means to the off condition during the time when said rotational speed of said video head is higher than the predetermined speed, whereby electric power for rotating said capstan motor is supplied through said switch means to said capstan motor.

2. A video tape recorder as claimed in claim 1, wherein said detecting means is further coupled to said drum motor for supplying power for controlling the rotational speed of said drum motor.

3. A video tape recorder as claimed in claim 2, wherein said drum motor is a brushless DC motor directly coupled to said cylindrical drum, and said detecting means comprises generating windings which are positioned in the same slots as the main windings of said motor.

4. A video tape recorder as claimed in claim 1, wherein said switch means is an electrical switch circuit including a pair of transistors coupled to each other, one of said transistors functioning to supply electric power to said capstan motor upon actuation of the other transistor in response to an output signal from said detecting means.

5. A video tape recorder as claimed in claim 4, wherein said switch means further includes a variable resistor coupled to the base of said other transistor for regulating the voltage supplied to said other transistor from said detecting means.

* * * * *